US012454470B2

(12) United States Patent
Cosentino et al.

(10) Patent No.: US 12,454,470 B2
(45) Date of Patent: Oct. 28, 2025

(54) HEAT PUMP SYSTEM WITH ELECTROLYTIC BIOCIDE-GENERATING UNIT

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US); Brian Alan Golden, Eden Prairie, MN (US)

(73) Assignee: ElectroSea, LLC, Plymouth, MN (US)

( * ) Notice: Subject to any disclaimer, the term of this patent is extended or adjusted under 35 U.S.C. 154(b) by 335 days.

(21) Appl. No.: 18/166,671

(22) Filed: Feb. 9, 2023

(65) Prior Publication Data
US 2023/0257286 A1 Aug. 17, 2023

Related U.S. Application Data

(60) Provisional application No. 63/308,317, filed on Feb. 9, 2022.

(51) Int. Cl.
*C02F 1/467* (2023.01)
*C02F 1/00* (2023.01)
(Continued)

(52) U.S. Cl.
CPC ............ *C02F 1/4674* (2013.01); *C02F 1/001* (2013.01); *F25B 13/00* (2013.01); *F25D 17/02* (2013.01);
(Continued)

(58) Field of Classification Search
CPC .... C02F 1/4674; C02F 1/001; C02F 2103/42; C02F 2301/046; C02F 2303/04; C02F 2303/20; F25B 13/00; F25D 17/02
See application file for complete search history.

(56) References Cited

U.S. PATENT DOCUMENTS 8,075,748 B2    12/2011    McAlister
9,140,465 B2    9/2015    Shibata et al.
(Continued)

FOREIGN PATENT DOCUMENTS

WO    2020210245 A1    10/2020

OTHER PUBLICATIONS

International Search Report and Written Opinion for PCT/US2023/062292, mailed Jul. 12, 2023.

(Continued)

*Primary Examiner* — Elizabeth J Martin
(74) *Attorney, Agent, or Firm* — Merchant & Gould P.C.

(57) ABSTRACT

The present disclosure relates to a heat pump system for transferring heat using a body of water. The heat pump system includes a water pumping system and a heating and cooling loop that directs a working fluid through a heat exchanger where heat is transferred between the working fluid and water from the body of water. The water pumping system includes an inlet line, an outlet line, and a pump. The pump moves the water from the body of water through the inlet line to the heat exchanger then through the outlet line and back to the body of water. A biocide generating device is positioned along the inlet line for providing real-time generation of biocide in the water flowing through the inlet line. A recirculation line directs water from a tap location on the inlet line positioned downstream from the biocide generating device to the water intake.

22 Claims, 14 Drawing Sheets

(51) Int. Cl.
  *C02F 103/42* (2006.01)
  *F25B 13/00* (2006.01)
  *F25D 17/02* (2006.01)

(52) U.S. Cl.
  CPC .... *C02F 2103/42* (2013.01); *C02F 2301/046* (2013.01); *C02F 2303/04* (2013.01); *C02F 2303/20* (2013.01)

(56) References Cited

U.S. PATENT DOCUMENTS

| | | | |
|---|---|---|---|
| 9,151,279 | B2 | 10/2015 | Ross et al. |
| 9,777,971 | B2 | 10/2017 | Nagurny et al. |
| 9,835,143 | B2 | 12/2017 | Teixeira et al. |
| 10,801,225 | B1* | 10/2020 | Reddy ................ C02F 1/46104 |
| 11,027,991 | B2 | 6/2021 | Cosentino et al. |
| 11,345,621 | B2 | 5/2022 | Cosentino et al. |
| 11,498,855 | B2 | 11/2022 | Cosentino et al. |
| 2013/0025300 | A1 | 1/2013 | Cho |
| 2020/0255306 | A1* | 8/2020 | Cosentino .............. B01D 36/00 |
| 2022/0112105 | A1 | 4/2022 | Cosentino et al. |
| 2023/0031923 | A1 | 2/2023 | Cosentino et al. |

OTHER PUBLICATIONS

Garcia et al., "Fouling in Heat Exchangers," Inverse Heat Conduction and Heat Exchangers, IntechOpen, DOI: http://dx.doi.org/10.5772/intechopen.88079, pp. 1-26 (2019).

Pugh et al., "Fouling During the Use of Seawater as Coolant—The Development of a 'User Guide,PST—'" Refereed Proceedings Heat Exchanger Fouling and Cleaning: Fundamentals and Applications, Engineering Conferences International, Published by ECI Digital Archives, pp. 1-14 (2003).

* cited by examiner

HEAT PUMP SYSTEM WITH ELECTROLYTIC BIOCIDE-GENERATING UNIT

CROSS-REFERENCE TO RELATED APPLICATION(S)

This application claims the benefit of U.S. Provisional Application Ser. No. 63/308,317, filed Feb. 9, 2022, the disclosure of which is hereby incorporated by reference in its entirety.

TECHNICAL FIELD

The present disclosure relates generally to heat pump systems and to systems for reducing or eliminating biofouling within water systems.

BACKGROUND

Biofouling caused by bio-growth (e.g., salt water or fresh water marine growth) can result in the clogging of water systems, and the inefficient operation, overheating, and malfunction of equipment dependent upon the water systems thereby leading to costly downtime and expensive repair. Systems have been developed to treat water systems in real-time to inhibit bio-fouling through the in-situ generation of biocide within the water passing through the water systems (e.g., see U.S. Pat. No. 11,027,991).

SUMMARY

One aspect of the present disclosure relates to heat pump systems including an in-situ biocide-generating arrangement for inhibiting biofouling within water drawn through a water system of the heat pump system that functions as a heat source. In one non-limiting example, the heat pump system can be adapted for heating a swimming pool or a building (e.g., a residence) and the heat source water can be drawn from a saltwater source such as oceans/seas or brackish water or a freshwater source (e.g., a lake, river, stream, etc.). In certain examples, the biocide-generating system can include an electrolytic arrangement for providing the in-situ generation of biocide within the water passing through the water system. In certain examples, biocide is introduced (e.g., circulated) to an intake of the water system to prevent the intake from being obstructed by biological growth.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows.

DETAILED DESCRIPTION

The present disclosure relates to a biocide-generating devices and systems for inhibiting biofouling within a water system. Example biocides can include chlorine and derivatives thereof, copper, and other biocides. Example biocide-generating devices can include electrolytic cells including electrodes adapted to generate biocides such as chlorine and derivatives thereof when electrical current flows across the electrodes. In certain examples, the biocide-generating devices or systems introduce biocide into the water flowing through the water systems in-situ (e.g., in real time during operation of the water systems). Preferably, the biocide is introduced at a concentration high enough to inhibit the growth of biomass within the components of the water system. Example water system components through which the biocide treated water flows can include heat exchangers such as an evaporator for a heat pump system. In certain examples, biocide is circulated to an inlet of the water system to resist bio-growth and related clogging at the inlet of the water system.

Figure 1:
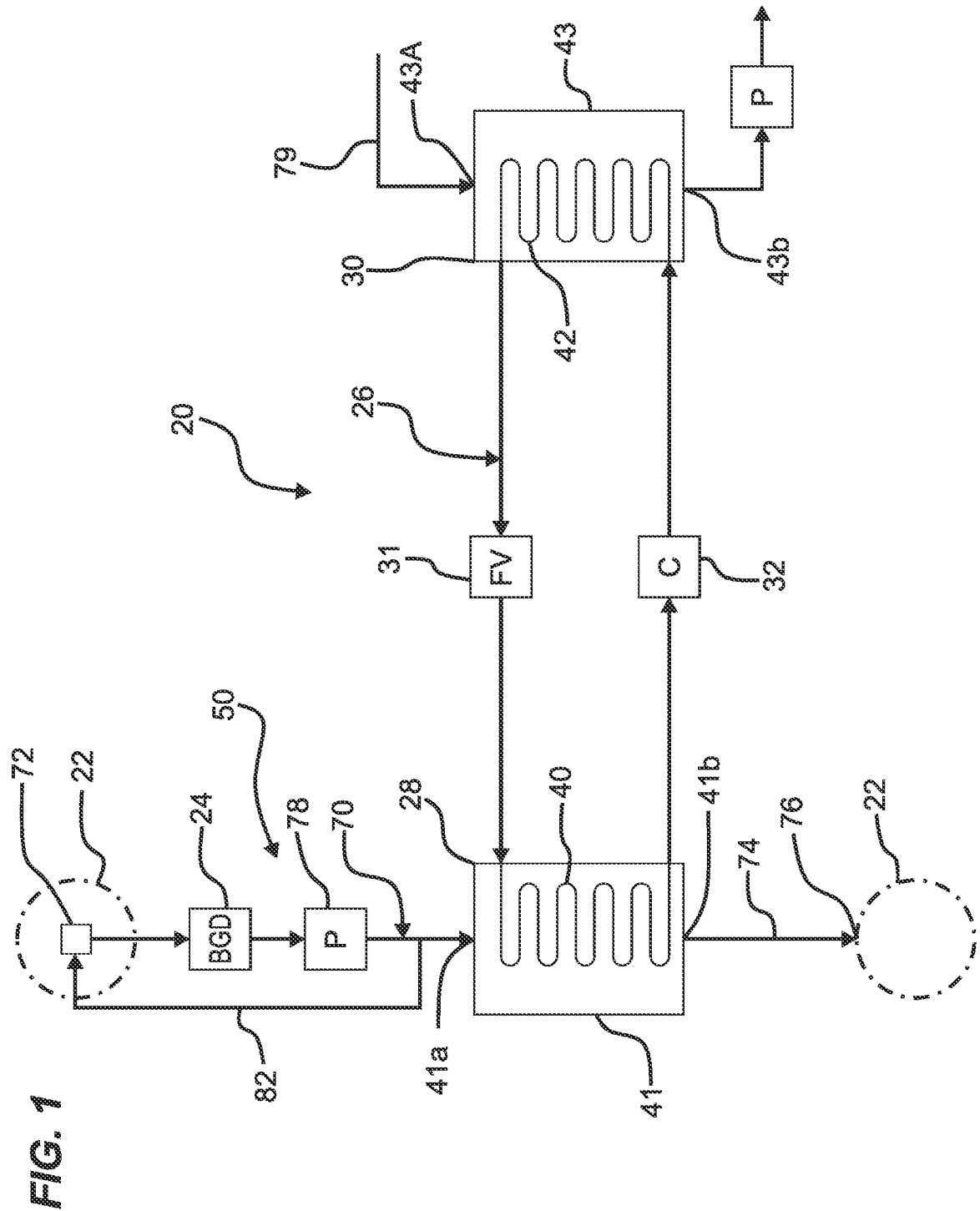
FIG. 1 depicts a heat pump system in accordance with the principles of the present disclosure.

FIG. 1 illustrates a heat pump system 20 adapted to use water from a body of water 22 as a heat source. The body of water 22 can include salt water (e.g., water from an ocean or sea), brackish water (e.g., water from an estuary), or fresh water (e.g., water from a lake, river, or stream). In one example, the heat pump system 20 includes a biocide generating device 24 for generating biocide to inhibit biological growth from compromising the efficient and reliable operation of the heat pump system 20. In one example, the biocide generating device 24 is adapted to generate biocide in real time with the operation of the heat pump system 20 without requiring storage of biocide (e.g., in a reservoir). In one example, the biocide generating device 24 can include an electrolytic cell for generating chlorine and/or chlorine derivatives as a biocide. In the case of salt and brackish waters, the water itself provides the salt required for the electrolytic production of chlorine and/or chlorine derivatives. In the case of fresh water, the biocide generating device 24 can include a salt supply for adding salt to the water for allowing the electrolytic production of chlorine and/or chlorine derivatives.

Referring still to FIG. 1, the heat pump system includes a heating and cooling loop 26 for circulating a first working fluid (e.g., a refrigerant) between an evaporator 28 and a condenser 30. A compressor 32 (e.g., a compressor pump) drives movement of the first working fluid around the loop 26. The compressor 32 compresses the first working fluid as the first working fluid flows along the loop 26 from the evaporator 28 to the condenser 30. A valve 31 (e.g., an expansion or throttle valve) expands the first working fluid as the first working fluid flows along the loop 26 from the condenser 30 to the evaporator 28. At the evaporator 28, the first working fluid draws heat from the water pumped from the body of water 22 to cause heating of the first working fluid. At the condenser 30, the first working fluid transfers heat to a second working fluid which causes cooling of the first working fluid and heating of the second working fluid. In one example, the second working fluid can be circulated between the condenser 30 and a building (e.g., a residence) to provide heating of the building. In another example, the second working fluid can include pool water circulated between the condenser 30 and a swimming pool to provide heating of the water within the swimming pool.

In certain examples, the evaporator 28 and the condenser 30 can each include a heat exchanger. For example, the evaporator 28 can include heat exchanger coils 40 through which the first working fluid flows. The evaporator 28 is configured such that the water drawn from the body of water 22 flows through a housing 41 of the evaporator and across the heat exchanger coils 40 such that heat is readily transferred from the heat source water to the first working fluid flowing through the heat exchanger coils 40. The housing can have an inlet 41a and an outlet 41b through which the heat source water flows. Also, the condenser 30 can include heat exchanger coils 42 through which the first working fluid flows. The condenser 30 is configured such that the second working fluid flows through a housing 43 of the condenser 30 and across the heat exchanger coils 42 such that heat is readily transferred from the first working fluid flowing through the heat exchanger coils 42 to the second working fluid. The housing can have an inlet 43a and an outlet 43b through which the second working fluid flows.

The heat pump system 20 also includes a pumping system 50 for pumping the heat source water from the body of water 22, through the evaporator 28 and back to the body of water 22. The heat source water drawn from the body of water 22 by the pumping system 50 enters the evaporator through the inlet 41a, flows within the evaporator housing 41 across the heat exchanger coils 40, exits the evaporator housing 41 through the outlet 41b, and flows from the outlet 41b back to the body of water 22. The pumping system 50 includes an inlet line 70 that extends from a water intake 72 at the body of water 22 to the inlet 41a of the evaporator 28. The pumping system 50 also includes an outlet line 74 that extends from the outlet 41b of the evaporator 28 to a discharge end 76 located at the body of water 22. The pumping system 50 also includes a pump 78 positioned along the inlet line 70 for pumping water through the pumping system 50.

The pumping system 50 further includes the biocide generating device 24 positioned along the inlet line 70. In one example, the biocide generating device 24 generates biocide in real-time with the operation of the pump 78 and does not require the storage of biocide. In one example, the biocide generating device 24 includes an electrolytic cell that generates a biocide such as chlorine and/or chlorine derivatives. In one example, the electrolytic cell includes electrodes and a strainer positioned in an electrolytic cell housing through which the intake water of the inlet line 70 flows. In one example, the biocide generating device 24 is positioned along the inlet line 70 at a location between the water intake 72 and the pump 78. In one example, the pumping system 50 includes a recirculation line 82 that directs water containing biocide back to the water intake 72 for inhibiting (e.g., resisting) biofouling of the water intake 72 as well as the portion of the inlet line 70 extending from the water intake through the biocide generating device 24. In one example, the recirculation line 82 branches from the inlet line 70 at a location between the pump 78 and the evaporator 28. In one example, water pressure for driving flow through the recirculation line 82 is generated from the same pump 78 used to drive water flow through the inlet line 70. In another example, a separate pump in addition to the pump 78 can be used to drive flow through the recirculation line 82. In one example, the amount of flow directed through the recirculation line is 5% to 50% or 5% to 40% or 5% to 30% or 10% to 50% or 10% to 40% or 10% to 30% or 10% to 25% or 15% to 50% or 15% to 40% or 15% to 30% or 15% to 25% or 20% to 50% or 30% to 40% or 20% to 30% of the flow directed through the inlet line 70.

In one example, the heat pump system includes an electronic controller that monitors flow and/or pressure within the inlet line 70 (e.g., via flow and/or pressure sensors) in relation to the operation of the pump 78 and uses the sensed data to detect/monitor blockage of the water intake. In one example, if the sensed blockage level exceeds a predetermined level, an alert is generated to provide an indication that the water intake should be inspected and cleaned. In one example, the electronic controller uses the sensed data to detect/monitor blockage of the strainer of the biocide generating device 24. In one example, if the sensed blockage level exceeds a predetermined level, an alert is generated to provide an indication that the strainer should be inspected and cleaned.

The heat pump system 20 can also include a pumping system 79 for moving the second working fluid through the condenser 30 at which the second working fluid is heated. The pumping system 79 also moves the second working fluid around a flow loop including the condenser 30 and also including a location or locations at which heat is withdrawn from the second working fluid prior to the second working fluid being directed back to the condenser 30.

The water intake 72 can have a configuration adapted to facilitate the efficient and effective distribution of biocide from the recirculation line 82 at intake openings of the water intake 72. In certain examples, the water intake 72 can perform an initial straining function with the intake openings being sized to prevent larger debris from entering the inlet line 70. In certain examples, the intake openings are larger than corresponding openings of the strainer incorporated within the biocide generating device so that the water intake 72 provides more coarse straining and the strainer in the biocide generating device provides more fine straining. In certain examples, the water intake is configured such that biocide from the recirculation line 82 is drawn inwardly though the intake openings into an interior volume of an intake member (e.g., a tube defining intake openings, a canister defining intake openings). In certain examples, one or more ports can be provided adjacent one or more of the intake openings for dispensing biocide (e.g., injecting, dispersing, releasing) from the recirculation line at the intake openings. In one example, one or more ports for dispensing the biocide are provided at each of the intake openings. In certain examples, a water flow control structure (e.g., a sleeve, manifold, collar, etc.) can define a water passage around the intake member having an entrance opening at which biocide from the recirculation line is dispensed. In one example, the entrance opening of the water passage is larger in cross-sectional area than the individual intake openings. The configuration can allow biocide from the recirculation line to be dispensed into an at least partially contained volume of water surrounding the intake member such that water drawn into the intake member through the intake openings has been treated with biocide that resists bio-growth and biofouling at the intake openings.

Figure 2:
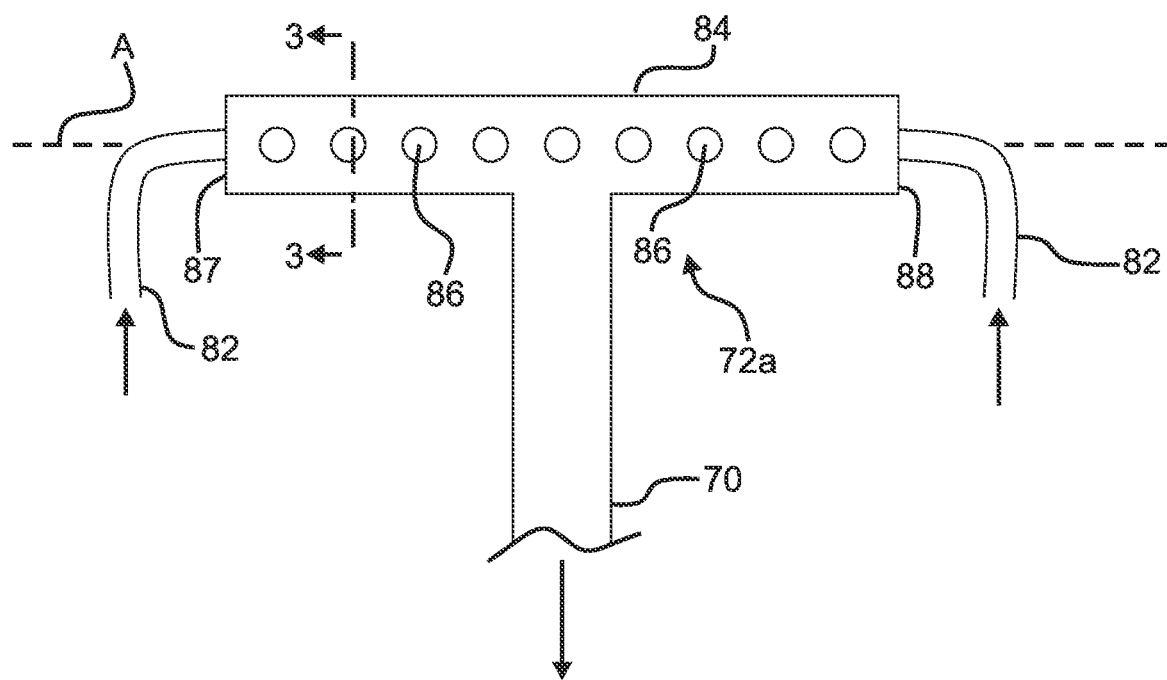
FIG. 2 depicts an example water intake configuration that can be used with the heat pump system of FIG. 1.
Figure 3:
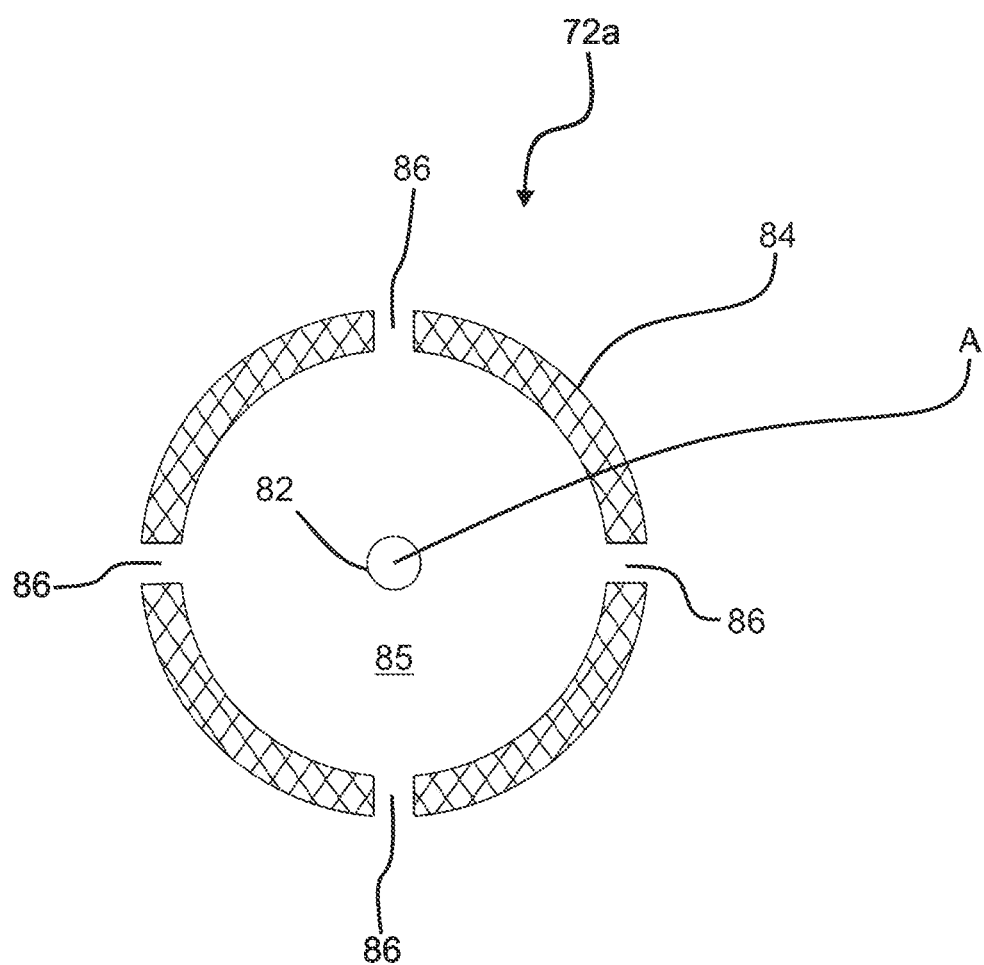
FIG. 3 is a cross-sectional view taken along section line 3-3 of FIG. 2.

FIGS. 2 and 3 depict an example water intake 72a that can be used as the water intake 72 of the system of FIG. 1. The water intake 72a includes an intake member 84 defining an inner volume 85. In one example, the intake member 84 defines a plurality of intake openings 86 spaced along a length of the intake member 84 for drawing water into the inner volume 85. The length extends along a central axis A of the intake member 84. In one example, the intake openings 86 are also spaced circumferentially about the axis A. In one example, the intake member 84 is a perforated pipe such as a cylindrical perforated pipe. The inlet line 70 is in fluid communication with the inner volume 85. In one example, the inlet line 70 connects to the intake member 84 at an intermediate location along the length of the intake member 84 with the intake member 84 being transversely oriented relative to the inlet line 70 such that the inlet line 70 and the intake member 84 cooperate to define a T-shaped configuration.

Referring to FIG. 2, the length of the intake member 84 extends between opposite first and second ends 87, 88. The recirculation line 82 fluidly connects to the inner volume 85 at the first and second ends 87, 88 such that the water containing biocide from the recirculation line 82 is dawn into the intake member 84 through the ends 87, 88. The biocide directed within the intake member 84 inhibits bio-growth at the intake openings 86 and within the volume 85. The biocide within the volume 85 is also drawn into the inlet line 70 to inhibit bio-growth in the inlet line 70 (e.g., in the region from the inlet line 70 from the intake member 84 to the biocide generating device 24).

Figure 4:
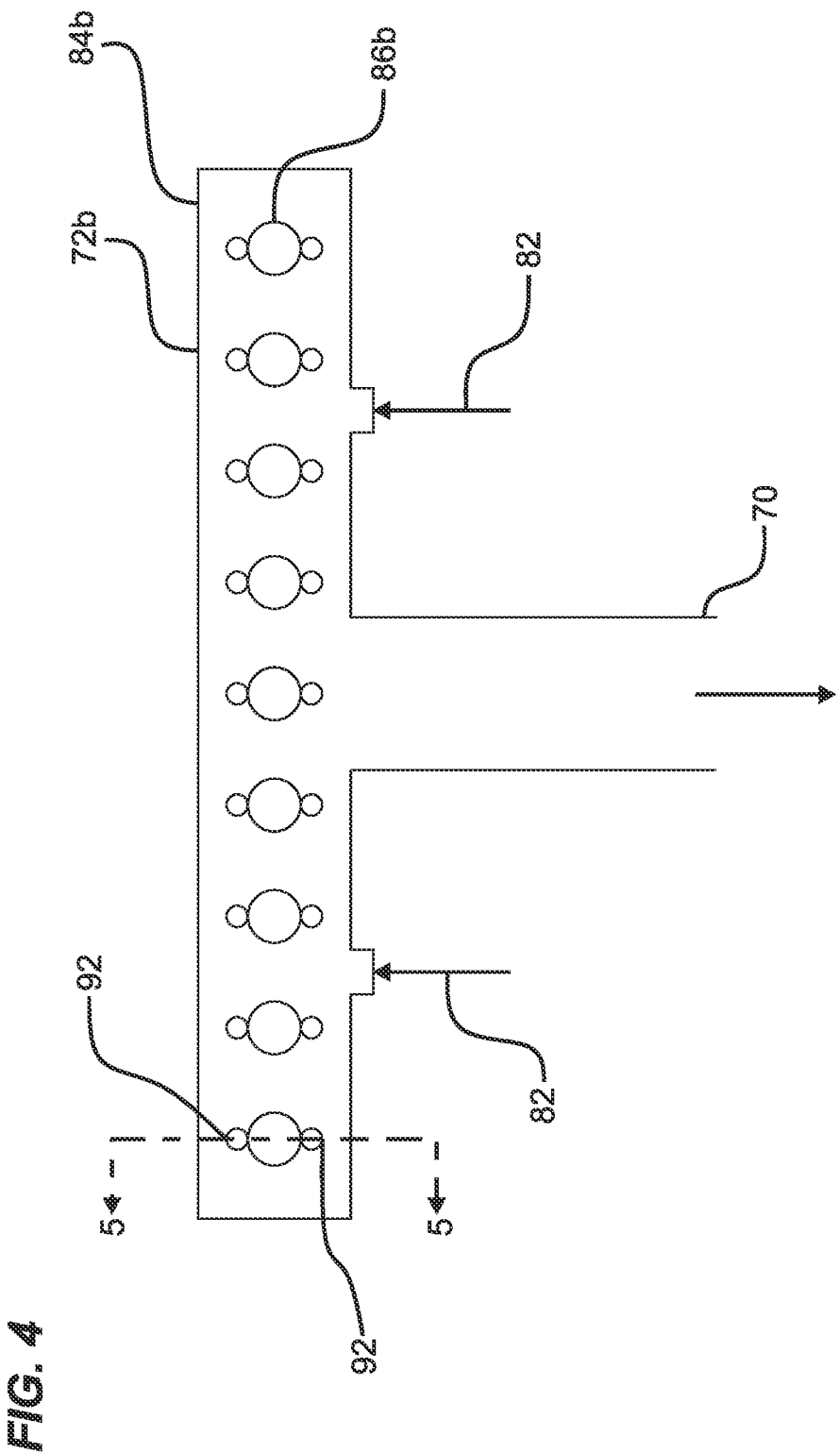
FIG. 4 depicts another example water intake configuration that can be used with the heat pump system of FIG. 1.
Figure 5:
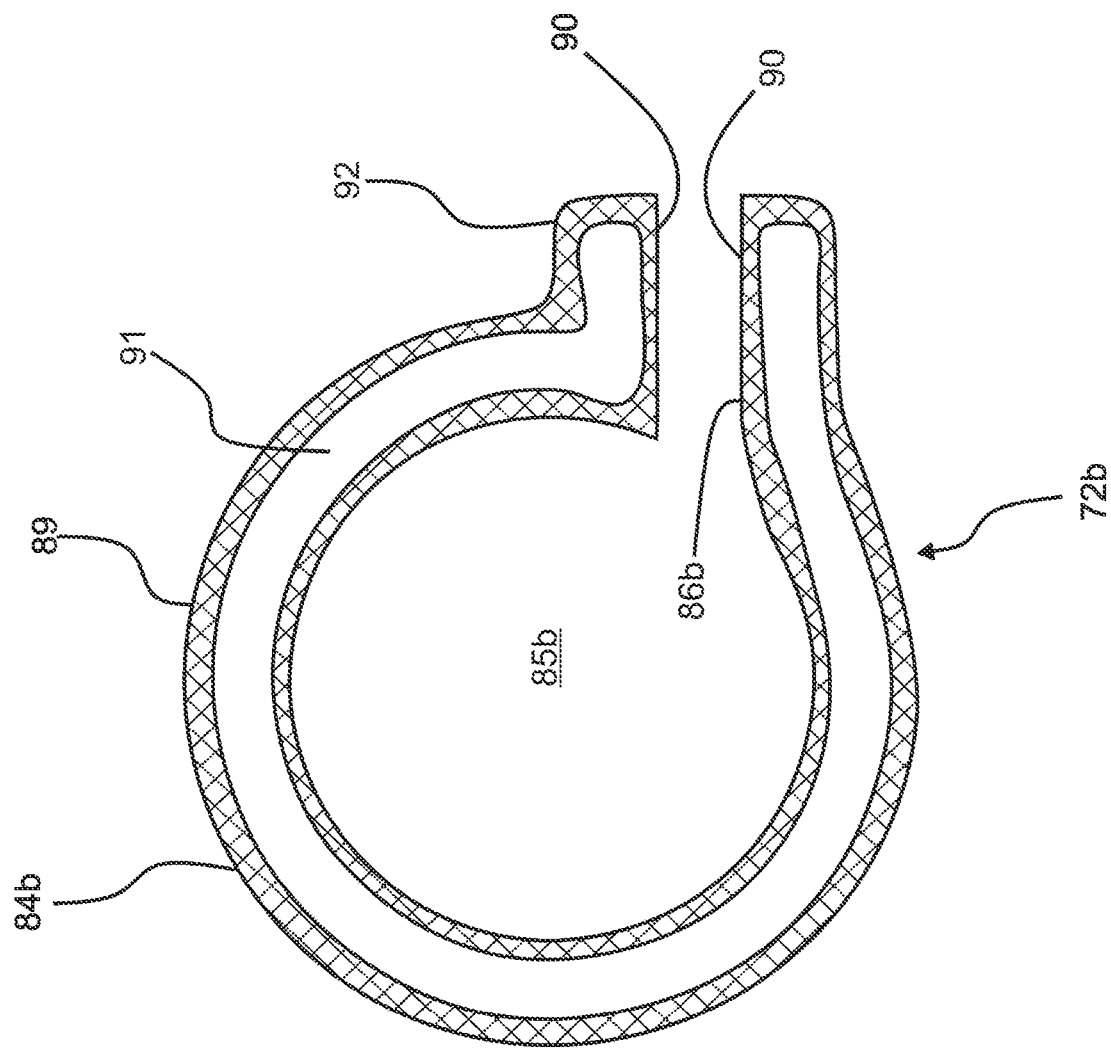
FIG. 5 is a cross-sectional view taken along section line 5-5 of FIG. 4.

FIGS. 4 and 5 depict another example water intake 72b that can be used as the water intake 72 of the system of FIG. 1 for supplying intake water to the inlet line 70. The water intake 72b includes an intake member 84b having an elongate, tubular configuration of the type described with respect to the intake member 84. The intake member 84b includes a plurality of intake openings 86b in fluid communication with an inner volume 85b of the intake member 84b. The intake openings 86b are configured for allowing water from the body of water to be drawn into the inner volume 85b. The inlet line 70 draws water from the inner volume 85b. It will be appreciated that the openings 86b can be arranged in rows that extend along the length of the intake member 84b and can be circumferentially spaced about the perimeter of the intake member 84b. In certain examples, the intake member 84b includes a wall 89 defining an internal structure 91 for directing water from the recirculation line 82 to one or more ports 90 positioned at outer ends of the intake openings 86b. In certain examples, the internal structure 91 can include a flow passage or flow passages. In certain examples, the wall 89 can function as a flow manifold for directing recirculation water from the recirculation line 82 to the various ports 90 of the intake member 84b. In certain examples, the ports 90 are positioned such that recirculation water containing biocide is provided (e.g., injected, supplied, directed, etc.) at outer ends of the intake openings 86b such that the biocide in the recirculation water is drawn into the inner volume 85b through the intake openings 86b. In this way, the biocide is provided for inhibiting bio-growth at the intake openings as well as within the interior volume 85b and within the intake line 70. The ports 90 can be defined by projections 92 that extend outwardly from main exterior of the wall 89.

Figure 6:
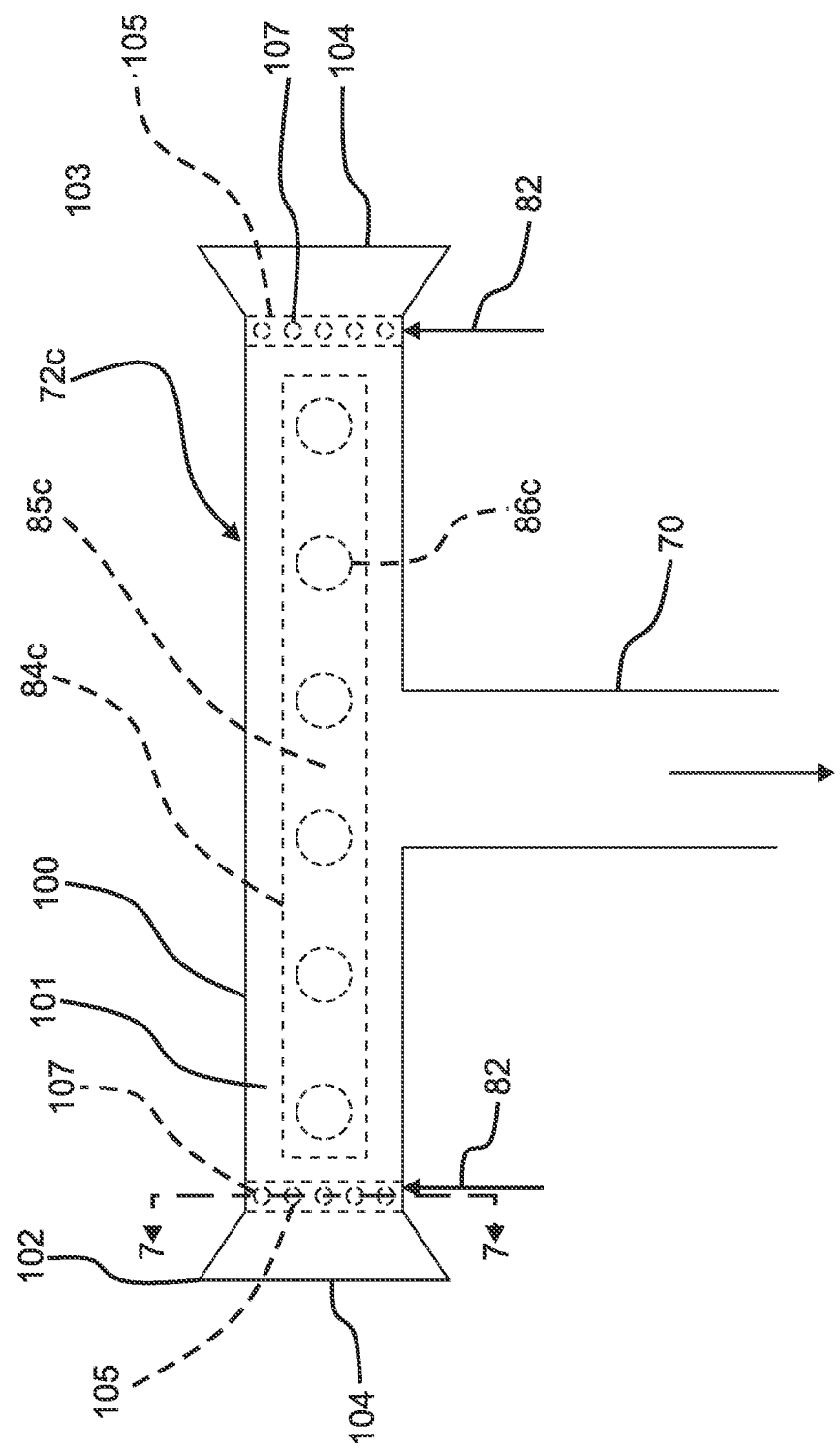
FIG. 6 depicts another example water intake configuration that can be used with the heat pump system of FIG. 1.
Figure 7:
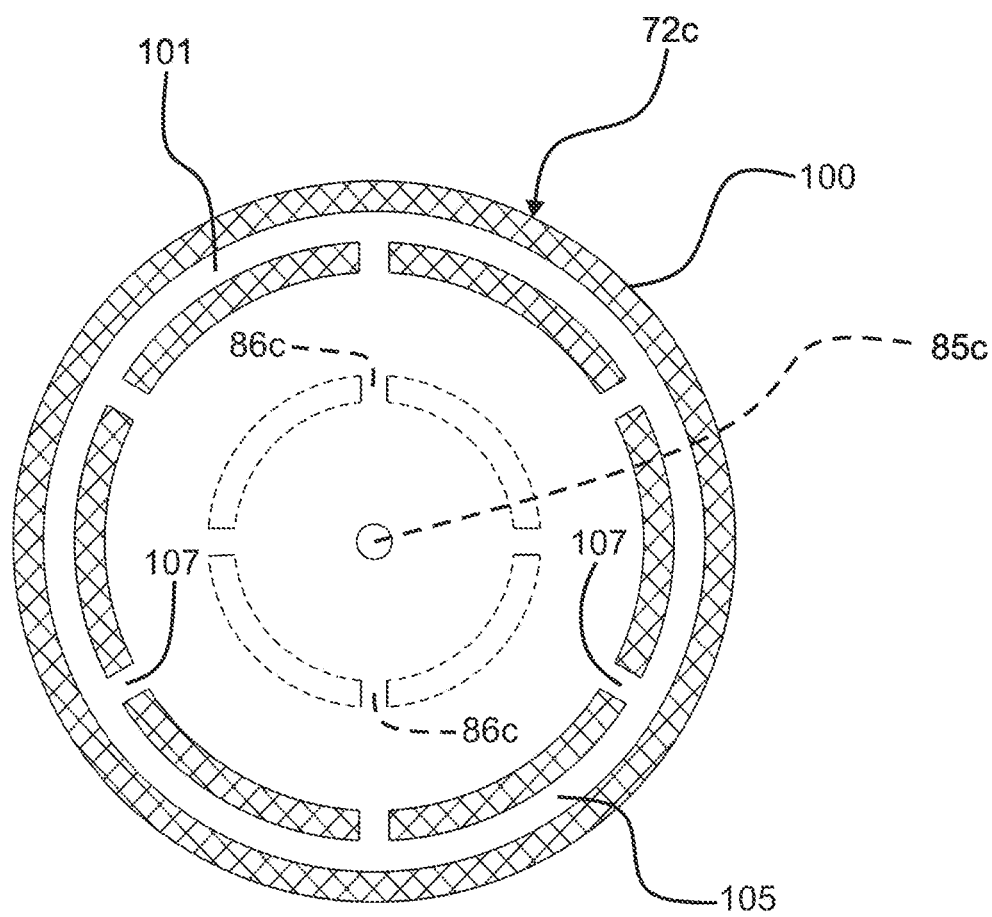
FIG. 7 is a cross-sectional view taken along section line 7-7 of FIG. 6.

FIGS. 6 and 7 depict another example water intake 72c that can be used as the water intake 72 of the system of FIG. 1 for supplying intake water to the inlet line 70. The water intake 72c includes an intake member 84c having an elongate, tubular configuration of the type described with respect to the intake member 84. The intake member 84c can also include intake openings 86c of the type described with respect to the intake member 84 for allowing water from the body of water to be drawn into an inner volume 85c of the intake member 84c. The openings 86c can be arranged along the length of the intake member 84c and around a circumference of the intake member 84c. The inlet line 70 draws water from the inner volume 85c. The water intake 72c also includes a flow control device for forcing the water from the body of water to flow along a predetermined path prior to entering the openings 86c. In certain examples, the path is preferably defined by a structure that surrounds at least a portion of the intake member 84c. In the depicted example, the flow control device includes a sleeve 100 coaxially positioned about the intake member 84c. In the depicted example, a flow passage 101 shown as an annular passage is defined between an inner surface of the sleeve 100 and an outer surface of the intake member 84c. The sleeve 100 includes opposite ends 102, 103 defining water entrance openings 104. Water from the body of water enters the sleeve 100 through the entrance openings 104 and flows axially along the flow passage 101 to reach the intake openings 86c of the intake member 84c. The sleeve also includes recirculation ports 107 positioned adjacent to each of the entrance openings 104 for dispensing recirculation water containing biocide into the water being drawn into the flow passage 101 through the entrance openings 104. The ports 107 can be positioned around the central axis of the intake member 84c. In one example, the ports 107 are radial ports that are in fluid communication with ring-shaped passages 105 defined by the sleeve 100. The ring-shaped passages 105 surround the central axis of the intake member 84c and the sleeve 100 and are in fluid communication with the recirculation line 82. The radial ports 107 are located at inner diameters of the ring-shaped passages 105.

Figure 8:
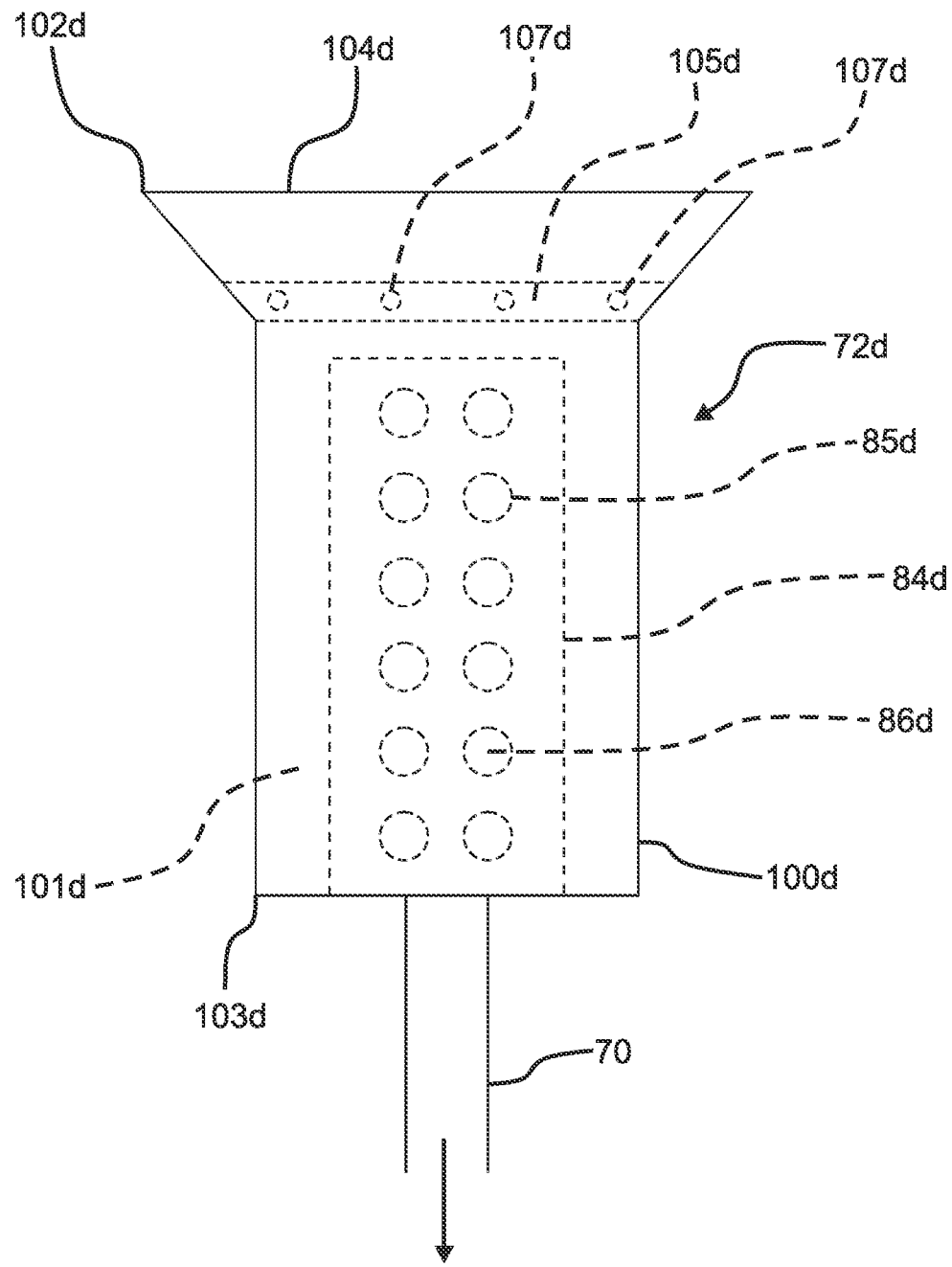
FIG. 8 depicts another example water intake configuration that can be used with the heat pump system of FIG. 1.
Figure 9:
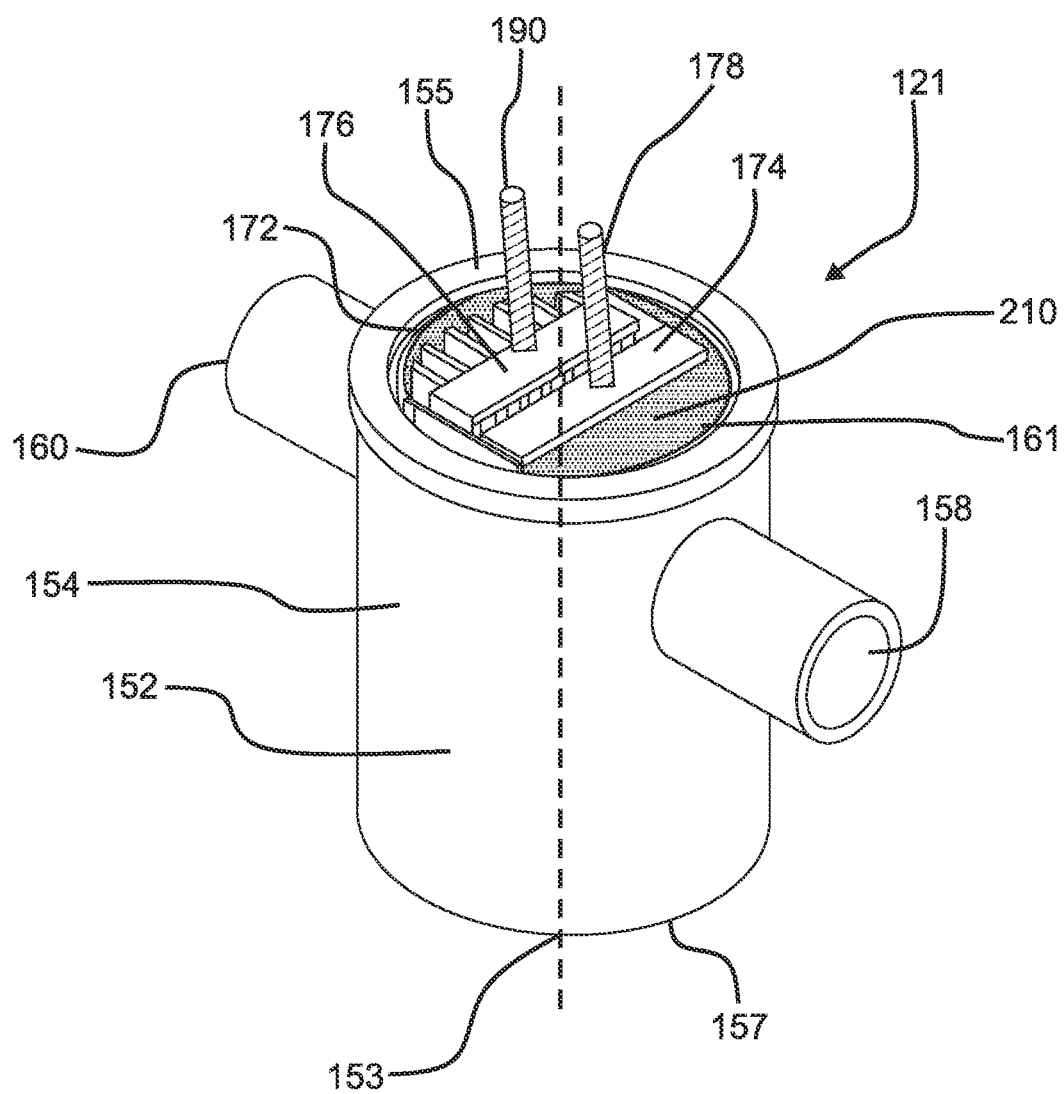
FIG. 9 depicts an example biocide generating device that can be used with the heat pump system of FIG. 1.
Figure 10:
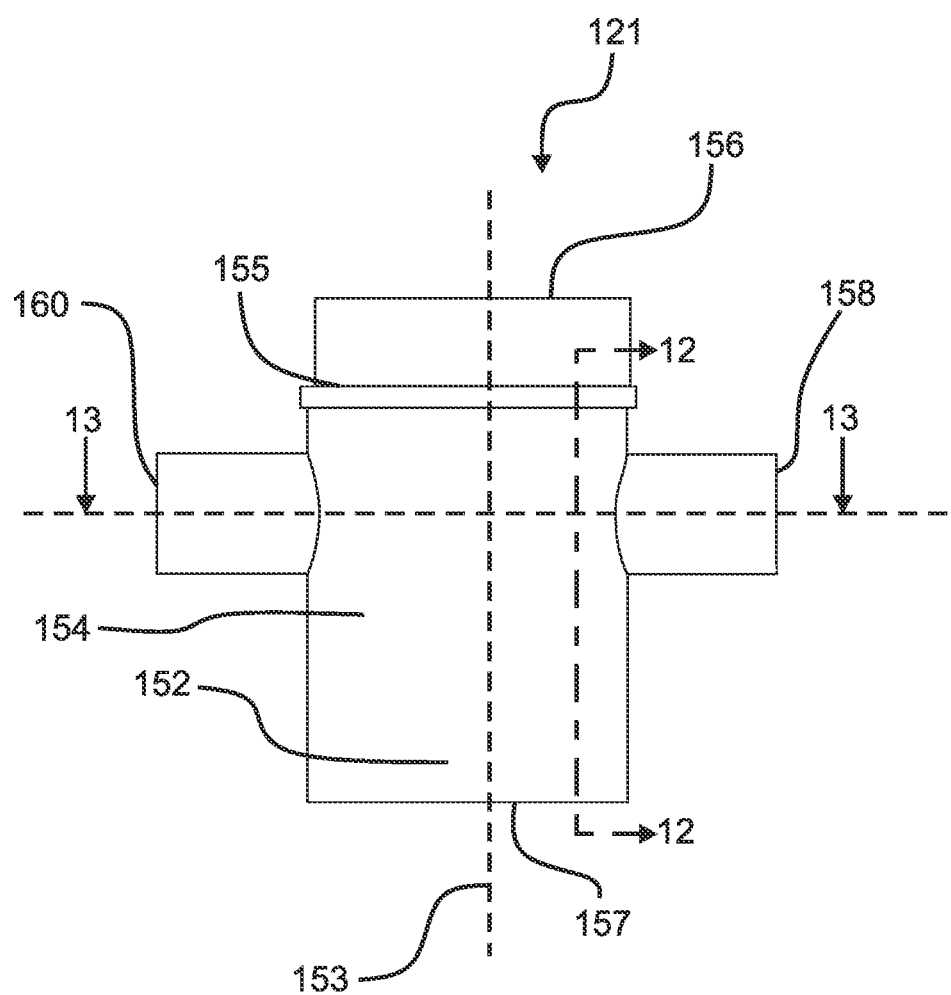
FIG. 10 is a front view of the biocide generating device of FIG. 9.
Figure 11:
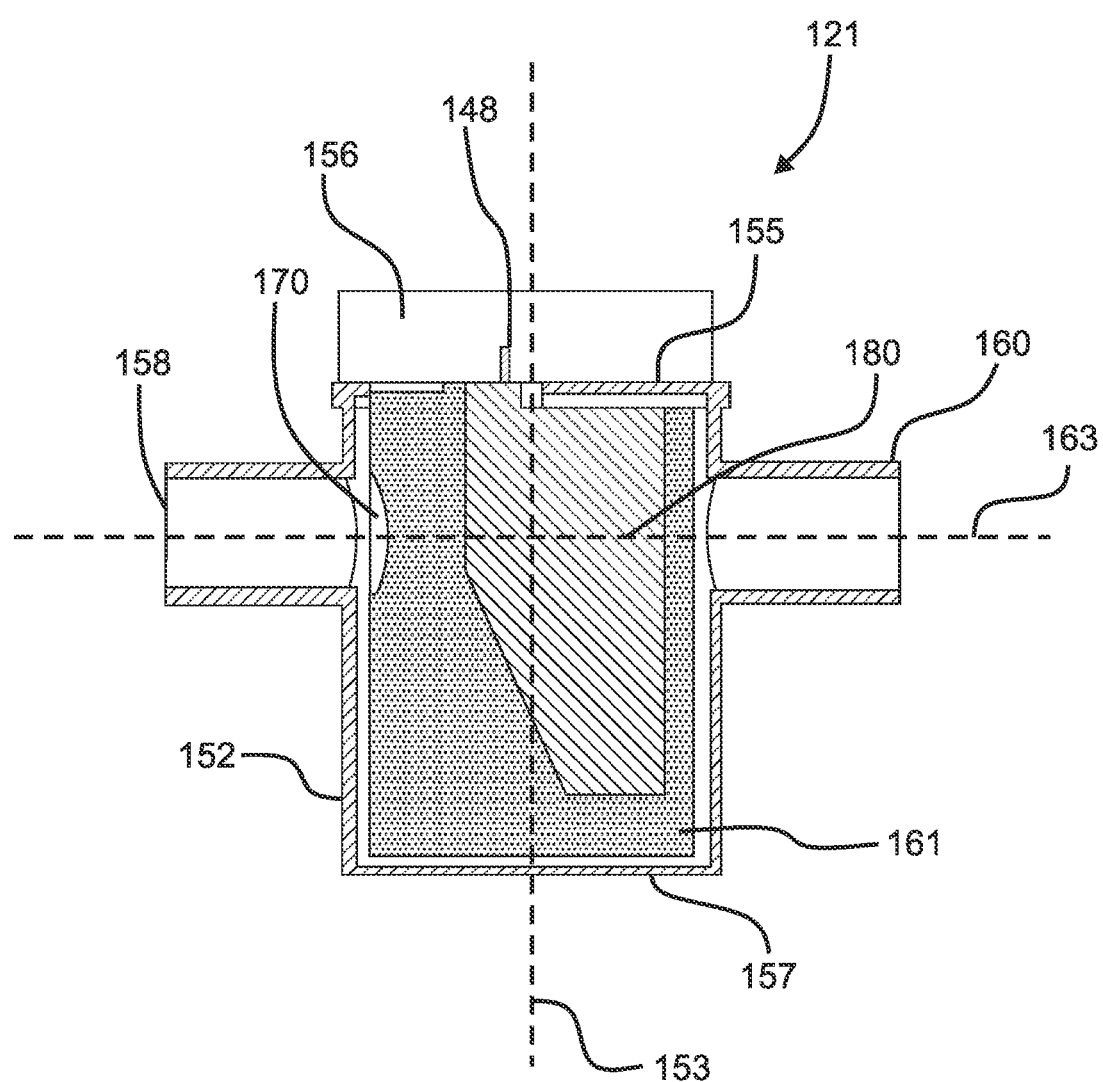
FIG. 11 is a cross-sectional view taken along a vertical plane through the inlet and outlet of the biocide generating device of FIG. 9.
Figure 12:
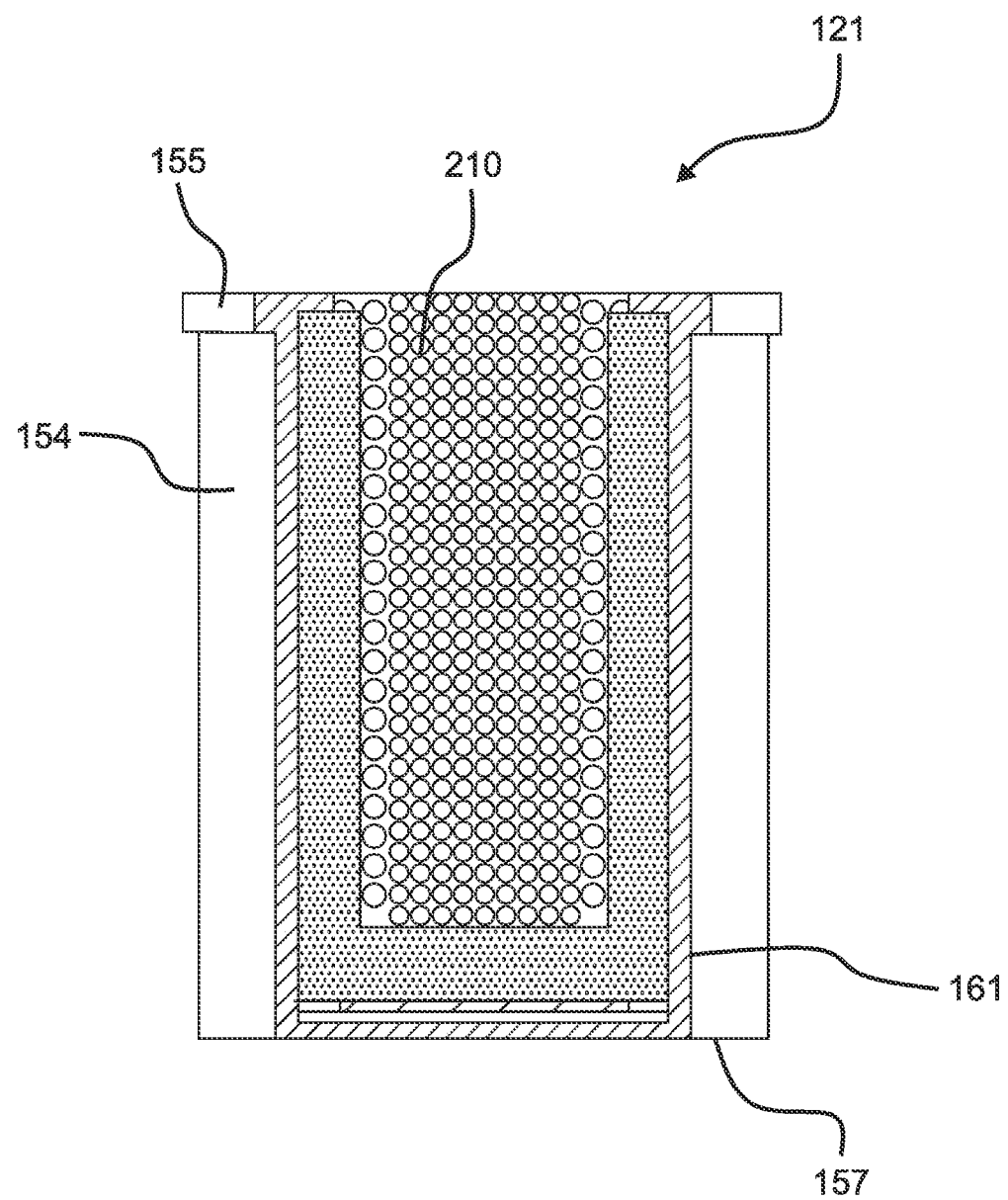
FIG. 12 is another cross-sectional view taken along a vertical plane through the biocide generating device of FIG. 9.
Figure 13:
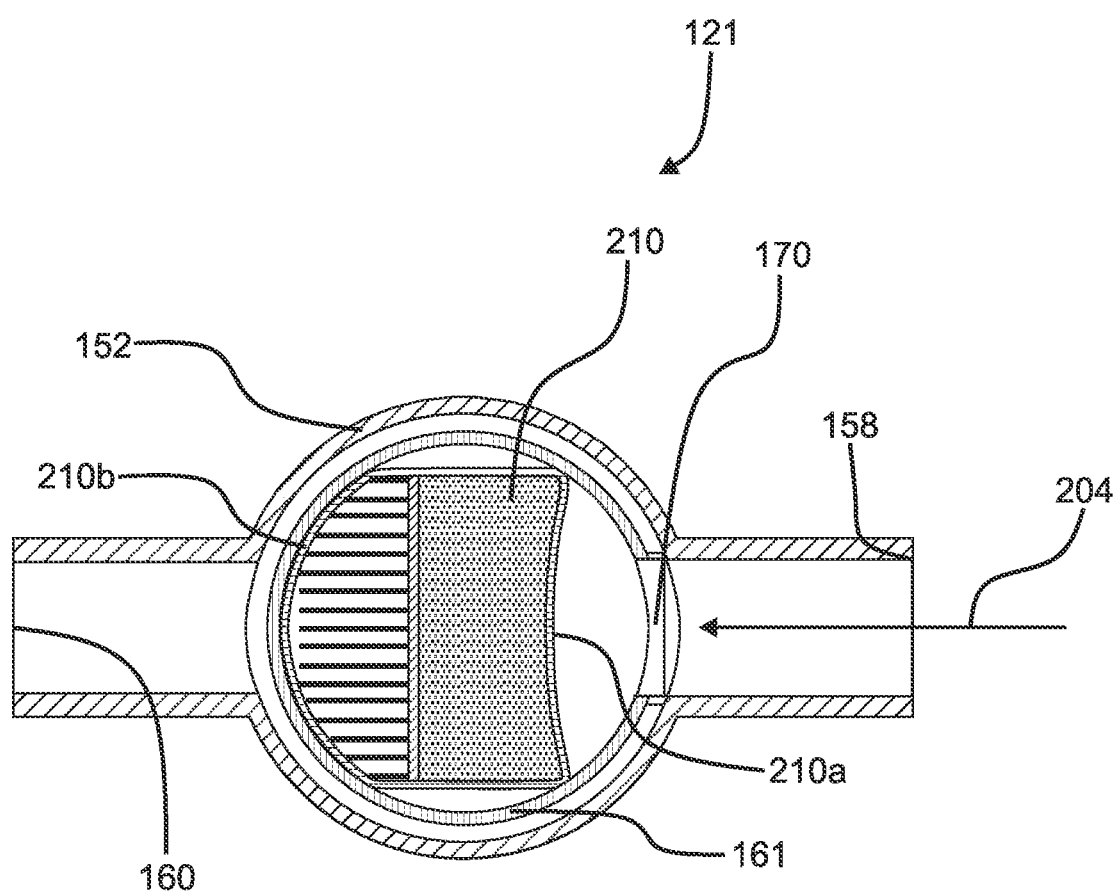
FIG. 13 is a cross-sectional view taken along a horizontal plane through the biocide generating device of FIG. 9.
Figure 14:
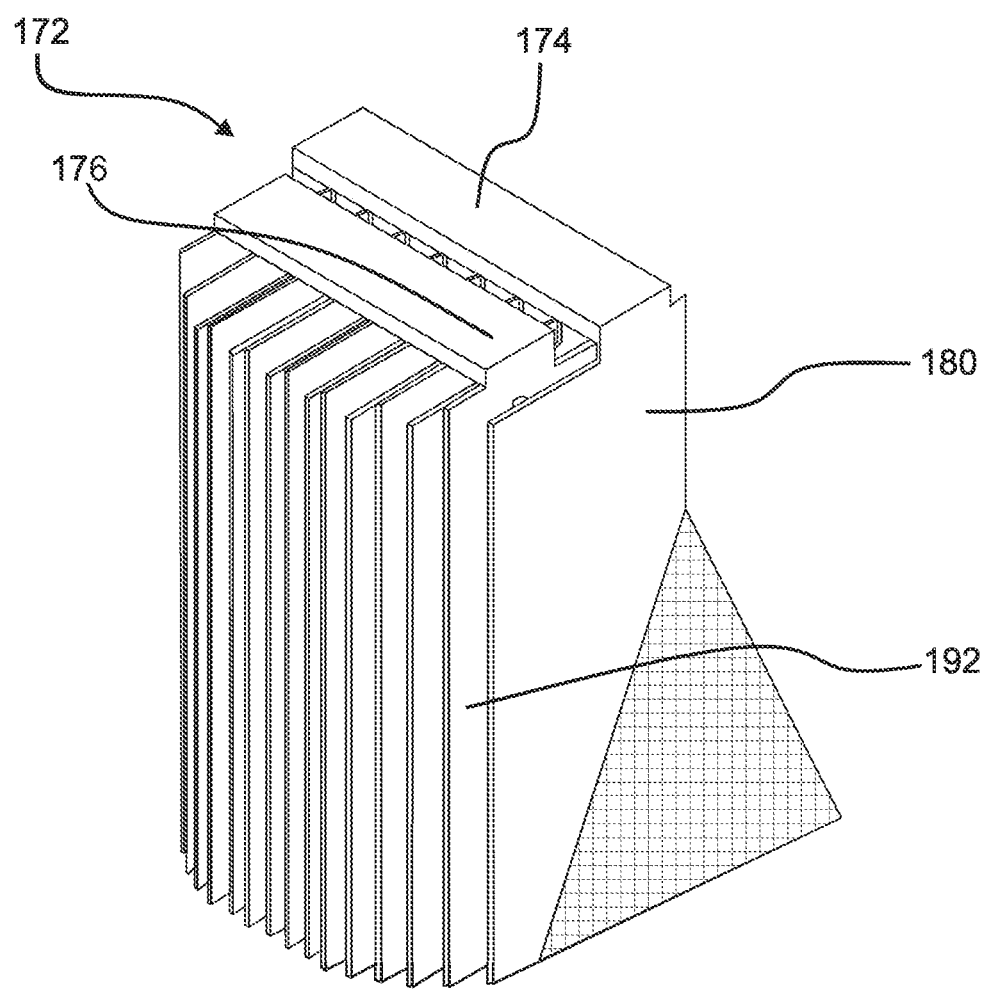
FIG. 14 depicts electrode plates of the biocide generating device of FIG. 9.

FIG. 8 depicts another example water intake 72d that can be used as the water intake 72 of the system of FIG. 1 for supplying intake water to the inlet line 70. The water intake 72d includes an intake member 84d depicted as a cylindrical canister. The intake member 84d can also include intake openings 86d of the type described with respect to the intake member 84 for allowing water from the body of water to be drawn into an inner volume 85d of the intake member 84d. The openings 86d can be arranged along the length of the intake member 84d and around a circumference of the intake member 84d. The inlet line 70 draws water from the inner volume 85d. The water intake 72d also includes a flow control device for forcing the water from the body of water to flow along a predetermined path prior to entering the openings 86d. In certain examples, the path is preferably defined by a structure that surrounds at least a portion of the intake member 84d. In the depicted example, the flow control device includes a sleeve 100d coaxially positioned about the intake member 84d. In the depicted example, a flow passage 101d shown as an annular passage is defined between the inner surface of the sleeve 100d and the outer surface of the intake member 84d. The sleeve 100d has an open end 102d and an opposite closed end 103d. The open end 102d defines a water entrance openings 104d. Water from the body of water enters the sleeve 100d through the entrance opening 104d and flows axially along the flow passage 101d to reach the intake openings 86d of the intake member 84d. The sleeve 100d also includes recirculation ports 107d positioned adjacent the entrance openings 104d for dispensing recirculation water containing biocide into the water being drawn into the flow passage 101d through the entrance openings 104d. The ports 107d can be positioned around the central axis of the intake member 84d. In one example, the ports 107d are radial ports that are in fluid communication with a ring-shaped passage 105d defined by the sleeve 100d. The ring-shaped passage 105d surrounds the central axis of the intake member 84d and the sleeve 100d and is in fluid communication with the recirculation line 82. The radial ports 107d are located at an inner diameters of the ring-shaped passage 105d.

An example biocide generating device 121 that can be used as the biocide generating device 24 of FIG. 1 can be seen in FIGS. 9-14. The biocide generating device 121 is depicted as an electrolytic cell including a housing 152 (e.g., a canister) including a main housing body 154 and a lid 156. The lid 156 is preferably removable from the main housing body 154 and can also be referred to as a cover. In certain examples, the lid 156 is removably mounted at a top of the main housing body 154. In certain examples, fasteners such as bolts, nuts, clips, clamps, or other structures can be used to removably attach the lid 156 to the main housing body 154. The housing 152 includes a longitudinal axis 153 that extends between opposite first and second ends 155, 157 of the housing 152. The second end 157 corresponds to a closed end of the main housing body 154. The lid 156 is located at the first end 155 of the housing 152 and is adapted to cover an open end of the main housing body 154.

A strainer 161 mounts within an interior of the housing 152. It will be appreciated that a water strainer is a device that mechanically filters the water drawn into the water inlet line 70 to prevent undesirable material (e.g., particulates over a certain size) from moving past the biocide generating device along the inlet line 70. It will be appreciated that the strainer 161 can be periodically removed from the housing 152, cleaned, and then returned to the interior of the housing 152. It will be appreciated that different strainers can have different levels of filtration ranging from coarse to fine.

The main housing body 154 includes a water inlet 158 and a water outlet 160. As depicted, the water inlet 158 and the water outlet 160 are co-axially aligned along an axis 163 that is transversely oriented with respect to the longitudinal axis 153 of the housing 152. The axis 163 is located at an upper third of a length of the housing 152 that extends between the first and second ends 155, 157. Water entering the main housing body 154 through the inlet 158 flows into an interior of the strainer 161 such that the water passes through the strainer 161 to reach the outlet 160. In this way, debris is captured within the strainer, which in a preferred example, has a basket-like configuration.

The biocide generating device includes an electrode arrangement 172 that fits within the interior of the strainer 161 within the interior of the housing 152. In the depicted example, the electrode arrangement 172 includes a first electrode 174 and a second electrode 176. The first electrode 174 includes a first terminal 178 electrically coupled to a plurality of parallel first electrode plates 180. The second electrode 176 of the electrode arrangement 172 includes a second terminal 190 electrically coupled to a plurality of parallel second electrode plates 192. The second electrode plates 192 are positioned between the first electrode plates 180 and spaced apart in relation to the first electrode plates 180 such that interstitial space exists between each of the first electrode plates 180 and a corresponding one of the second electrode plates 192. Dielectric spacers can separate the plates 180, 192.

In certain examples, the terminals and the electrode plates can have metal constructions that include a metal material such as titanium or stainless steel. In certain examples, first and second electrode plates can be coated with a catalyst material for catalyzing the production of chlorine or derivatives thereof. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium, and/or oxides of titanium, and/or oxides of tantalum, and/or oxides of niobium. It will be appreciated that the above catalysts are merely examples and that other catalyst mixtures can also be used. In other examples, at least one of the sets of the first and second electrode plates is constructed of a material that includes copper such that copper ions are generated when voltage is applied across the first and second electrode plates.

In a preferred example, the electrode arrangement 172 is mounted to the lid 156 of the housing 152. The first and second electrode plates 180, 192 are secured at a bottom/under side of the lid 156 and project downwardly from the inner side of the lid 156. When the lid 156 is mounted on the main housing body 154, the electrode plates 180, 192 fit within the interior of the housing 152 and within the interior of the strainer 161. During operation of the electrolytic cell, the interior of the housing 152 fills with water flowing through the inlet line 70 such that the first and second electrode plates 180, 192 are preferably fully submerged within the water flowing through the housing 152. The electrode arrangement 172 is preferably coupled to the lid 156 such that the electrode arrangement 172 is carried with the lid 156 when the lid 156 is removed from the main housing body 154. When it is desired to clean the strainer 161, the lid 156 is removed from the main housing body 154 to provide access to the strainer 161. When the lid 156 is removed, the electrode arrangement 172 is carried with the lid 156 and concurrently removed from the interior of the strainer 161 so as to not interfere with the subsequent removal of the strainer 161 for cleaning.

In a preferred example, water flowing through the strainer 161 flows through the interstitial space between the first and second electrode plates 180, 192 in a direction shown by arrows 204. In certain examples, the first and second electrode plates 180, 192 are located within the strainer 161 with open ends of the interstitial spaces between the electrode plates 180, 192, facing toward an inlet opening 170 of the strainer and in alignment with the water inlet 158 of the housing 152.

The biocide generating device can be controlled by a control system which may include a controller 148 for controlling various functions. Example functions include: a) power conversion (e.g., DC-DC and/or AC-DC power conversion); b) power regulation (the depicted example shows a DC power regulator 249 attached to a cell power circuit 256); c) electrode polarity switching; d) periodically terminating power to the electrodes and connecting the electrodes together and to a zero reference voltage; e) isolating the circuitry; f) monitoring water flow through the biocide-generating device 121; and g) adjusting the magnitude of the electrical current flowing across the electrodes based on the water flow through the cell. To coordinate and implement these various functionalities, the control system can include a controller 148 having one or more processors. The processors can interface with software, firmware, and/or hardware. Additionally, the processors can include digital or analog processing capabilities and can interface with memory (e.g., random access memory, read-only memory, or other data storage). In certain examples, the processors can include a programmable logic controller, one or more microprocessors, or like structures. The processors can also interface with displays (e.g., indicator lights, etc.) and user interfaces (e.g., control buttons, switches, etc.) mounted at an exterior of the housing 152. Other functions of the control system are discussed in U.S. Pat. No. 11,027,991, which is incorporated herein by reference.

In some examples, the electrode plates 180, 192 are protected by a protective sleeve 210. Preferably, the protective sleeve 210 has a dielectric construction (e.g., a material such as polyvinyl chloride, nylon, polytetrafluoroethylene, polycarbonate etc.). The protective sleeve 210 has an upstream side 210a and a downstream side 210b with openings for allowing water to flow through the protective sleeve 210 and between the electrode plates 180, 192. The openings are adapted for assisting in distributing flow across the surfaces of the electrode plates 180, 192.

Further details about biocide generating devices suitable for use in systems in accordance with the principles of the present disclosure are disclosed in U.S. Pat. No. 11,027,991; PCT Publication No. WO 2020/210245; and U.S. Publication No. 2023/0031923, all of which are incorporated herein by reference in their entireties. Other aspects of the recirculating line are discussed in U.S. Pat. No. 11,027,991; and U.S. Publication No. 2020/0255306, both which are incorporated herein by reference in their entireties.

It should be appreciated that there are many heat pump system variations which may incorporate the concepts disclosed herein. For example, the transfer of heat may be reversed such that the heat pump system is used for cooling. Heat pump systems may be capable of both heating and cooling using a reversing valve or similar mechanism. Heat exchangers are capable of both cooling and heating, or condensing and evaporating, depending on the delta in temperature between the fluid in the coils of the heat exchanger and the fluid surrounding the coils of the heat exchanger. The words evaporator and condenser should be read to be interchangeable depending on the direction of heat flow. The biocide systems disclosed work for both heating and cooling purposes.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A heat pump system for transferring heat using a body of water, the heat pump system comprising:
   a heating and cooling loop that directs a working fluid through a heat exchanger where heat is transferred between the working fluid and water from the body of water; and
   a water pumping system including:
      an inlet line that conveys the water to the heat exchanger where heat is transferred between the water and the working fluid, the inlet line including a water intake at the body of water;
      an outlet line that returns the water from the heat exchanger to the body of water;
      a pump for moving the water from the body of water through the inlet line, the heat exchanger, and the outlet line;
      a biocide generating device positioned along the inlet line for providing real-time generation of biocide in the water flowing through the inlet line; and
      a recirculation line for directing water from a tap location on the inlet line positioned downstream from the biocide generating device to the water intake,
   wherein the heat pump system is adapted for use in swimming pools or buildings, wherein the water intake includes an intake member defining a plurality of water intake openings, the recirculation line feeding recirculation water to discharge ports provided at the water intake openings.

2. The heat pump system of claim 1, wherein the pump is positioned along the inlet line at a location between the biocide generating device and the tap location.

3. The heat pump system of claim 1, wherein the biocide generating device includes an electrolytic cell including electrodes for generating chlorine and/or chlorine derivatives in the water flowing through the inlet line.

4. The heat pump system of claim 2, wherein pressure from the pump moves water through the recirculation line without requiring another pump.

5. The heat pump system of claim 1, wherein the biocide generating device includes a strainer.

6. The heat pump system of claim 5, wherein the water intake provides straining of the water drawn into the water inlet that is coarser than straining provided by the strainer of the biocide generating device.

7. The heat pump system of claim 1, wherein flow through the recirculation line is 5% to 30% of the flow through the inlet line.

8. The heat pump system of claim 1, wherein flow through the recirculation line is 10% to 30% of the flow through the inlet line.

9. The heat pump system of claim 1, wherein flow through the recirculation line is 15% to 30% of the flow through the inlet line.

10. The heat pump system of claim 1, wherein the intake member defines a length that extends between opposite first and second ends, the plurality of water intake openings spaced along the length, the intake member cooperating with the inlet line to define a T-shaped configuration, the recirculation line feeding recirculation water into the intake member through the first and second ends.

11. The heat pump system of claim 1, wherein the intake member includes a manifold for directing the recirculation water to the discharge ports.

12. The heat pump system of claim 1, wherein the intake member defines a length that extends between opposite first and second ends, the plurality of water intake openings spaced along the length of the intake member and around a circumference of the intake member, the water intake member cooperating with the inlet line to define a T-shaped configuration, the water intake including a sleeve that surrounds the intake member and defines water entrance openings adjacent the first and second ends of the intake member for allowing water to flow into an annular passage defined between the intake member and the sleeve, the recirculation line feeding recirculation water into an interior of the sleeve via the discharge ports.

13. The heat pump system of claim 1, wherein the intake member is an intake canister having a length that extends between opposite first and second ends, the plurality of water intake openings spaced along the length of the intake canister and around a circumference of the intake canister, the water intake including a sleeve that surrounds the intake canister and defines a water entrance opening adjacent the first end of the intake canister for allowing water to flow into an annular passage defined between the intake canister and the sleeve, the recirculation line feeding recirculation water into an interior of the sleeve via the discharge ports.

14. A pumping system for use with a heat pump comprising:
   an inlet line that conveys water from a body of water to a heat exchanger where heat is transferred between the water and a working fluid, the inlet line including a water intake at the body of water;
   an outlet line that returns the water from the heat exchanger to the body of water;
   a pump for moving the water from the body of water through the inlet line, the heat exchanger, and the outlet line;
   a biocide generating device positioned along the inlet line for providing real-time generation of biocide in the water flowing through the inlet line; and
   a recirculation line for directing water from a tap location on the inlet line positioned downstream from the biocide generating device to the water intake,
   wherein the water intake includes a tubular intake member having a length that extends between opposite first and second ends, the intake member defining a plurality of water intake openings spaced along the length, the intake member cooperating with the inlet line to define a T-shaped configuration, the recirculation line feeding recirculation water into the intake member through the first and second ends.

15. The pumping system of claim 14, wherein pressure from the pump moves water through the recirculation line without requiring another pump.

16. The pumping system of claim 14, wherein flow through the recirculation line is 5% to 30% of the flow through the inlet line.

17. A pumping system for use with a heat pump comprising:
   an inlet line that conveys water from a body of water to a heat exchanger where heat is transferred between the water and a working fluid, the inlet line including a water intake at the body of water;
   an outlet line that returns the water from the heat exchanger to the body of water;
   a pump for moving the water from the body of water through the inlet line, the heat exchanger, and the outlet line;
   a biocide generating device positioned along the inlet line for providing real-time generation of biocide in the water flowing through the inlet line; and
   a recirculation line for directing water from a tap location on the inlet line positioned downstream from the biocide generating device to the water intake,
   wherein the water intake includes an intake member defining a plurality of water intake openings, the recirculation line feeding recirculation water to discharge ports provided at the water intake openings.

18. The pumping system of claim 17, wherein the intake member includes a manifold for directing the recirculation water to the discharge ports.

19. The pumping system of claim 17, wherein pressure from the pump moves water through the recirculation line without requiring another pump.

20. A heat pump system for transferring heat using a body of water, the heat pump system comprising:
   a heating and cooling loop that directs a working fluid through a heat exchanger where heat is transferred between the working fluid and water from the body of water; and
   a water pumping system including:
      an inlet line that conveys the water to the heat exchanger where heat is transferred between the water and the working fluid, the inlet line including a water intake at the body of water;
      an outlet line that returns the water from the heat exchanger to the body of water;
      a pump for moving the water from the body of water through the inlet line, the heat exchanger, and the outlet line;
      a biocide generating device positioned along the inlet line for providing real-time generation of biocide in the water flowing through the inlet line; and
      a recirculation line for directing water from a tap location on the inlet line positioned downstream from the biocide generating device to the water intake,
   wherein the heat pump system is adapted for use in swimming pools or buildings, wherein the water intake includes a tubular intake member having a length that extends between opposite first and second ends, the intake member defining a plurality of water intake openings spaced along the length, the intake member cooperating with the inlet line to define a T-shaped configuration, the recirculation line feeding recirculation water into the intake member through the first and second ends.

21. A heat pump system for transferring heat using a body of water, the heat pump system comprising:
   a heating and cooling loop that directs a working fluid through a heat exchanger where heat is transferred between the working fluid and water from the body of water; and
   a water pumping system including:
      an inlet line that conveys the water to the heat exchanger where heat is transferred between the water and the working fluid, the inlet line including a water intake at the body of water;
      an outlet line that returns the water from the heat exchanger to the body of water;
      a pump for moving the water from the body of water through the inlet line, the heat exchanger, and the outlet line;
      a biocide generating device positioned along the inlet line for providing real-time generation of biocide in the water flowing through the inlet line; and
      a recirculation line for directing water from a tap location on the inlet line positioned downstream from the biocide generating device to the water intake,
   wherein the heat pump system is adapted for use in swimming pools or buildings, wherein the water intake includes a tubular intake member having a length that extends between opposite first and second ends, the intake member defining a plurality of water intake openings spaced along the length of the intake member and around a circumference of the intake member, the water intake member cooperating with the inlet line to define a T-shaped configuration, the water intake including a sleeve that surrounds the intake member and defines water entrance openings adjacent the first and second ends of the intake member for allowing water to flow into an annular passage defined between the intake member and the sleeve, the recirculation line feeding recirculation water into an interior of the sleeve via discharge ports positioned adjacent the water entrance openings.

22. A heat pump system for transferring heat using a body of water, the heat pump system comprising:
   a heating and cooling loop that directs a working fluid through a heat exchanger where heat is transferred between the working fluid and water from the body of water; and
   a water pumping system including:
      an inlet line that conveys the water to the heat exchanger where heat is transferred between the water and the working fluid, the inlet line including a water intake at the body of water;
      an outlet line that returns the water from the heat exchanger to the body of water;
      a pump for moving the water from the body of water through the inlet line, the heat exchanger, and the outlet line;
      a biocide generating device positioned along the inlet line for providing real-time generation of biocide in the water flowing through the inlet line; and
      a recirculation line for directing water from a tap location on the inlet line positioned downstream from the biocide generating device to the water intake,
   wherein the heat pump system is adapted for use in swimming pools or buildings, wherein the water intake includes an intake canister having a length that extends between opposite first and second ends, the intake canister defining a plurality of water intake openings spaced along the length of the canister and around a circumference of the canister, the water intake including a sleeve that surrounds the canister and defines a water entrance opening adjacent the first end of the canister for allowing water to flow into an annular passage defined between the canister and the sleeve, the recirculation line feeding recirculation water into an interior of the sleeve via discharge ports positioned adjacent the water entrance opening.

* * * * *